INVENTOR.
JOHN B. O'BRIEN
BY
ATTORNEY

United States Patent Office 3,611,665
Patented Oct. 12, 1971

3,611,665
SHEAR-STEEL-REINFORCED PRESTRESSED
CONCRETE BEAMS
John B. O'Brien, 1426 Laurel Ave.,
St. Paul, Minn. 55104
Filed Dec. 30, 1968, Ser. No. 787,826
Int. Cl. E04b 5/10
U.S. Cl. 52—723
10 Claims

ABSTRACT OF THE DISCLOSURE

Prestressed concrete T beams are taught wherein the shear steel reinforcing is a composite structural member prefabricated and immediately suitable for placement in the leg portion of a T beam with minimum tying of it to other members. This composite shear steel reinforcing member consists essentially of a plurality of shear steel reinforcing rod elements of relatively large cross-section spaced and fixed in position along two longitudinal rods of relatively small cross-section. The rods in both directions extend beyond the points of intersection to provide an "interlocking" possibility with other elements embedded in T beam structures as well as to provide guide means for proper placement of the composite members. Bundles of these prefabricated composite members provide the T beam manufacturing industry with new flexibility and speed for the manufacture of shear steel reinforced T beams of high and reliable quality at a significant reduction in cost.

This invention relates to improved prestressed single and double T concrete beams having new prefabricated shear steel reinforcing, to the new prefabricated shear steel reinforcing itself, and to an improved method of making single and double T beams employing the new shear steel reinforcing.

Prestressed concrete T beams are inherently also precast, as the term is understood in the industry. Such T beams are, broadly speaking, well known; and an illustrative teaching directed to the same is set forth in U.S. Pat. No. 3,302,348 (Pratt). An interesting discussion of some factors involved in steel reinforcing of T beams is set forth in U.S. Pat. No. 2,382,139 (Cueni), although the teaching of that patent is not directed to prestressed precast T beams of the type commonly formed. Still other U.S. patents, such as 1,613,392 (Greulich) and 2,916,910 (Boyer et al.), deal with special steel arrangements in various concrete beams, and require longitudinally oriented steel rods of substantial size to gain the type of results they specify.

None of the aforenoted patent teachings, and no prior art practices, insofar as is known, provides those skilled in the art of manufacturing prestressed T beams with a simplified shear steel reinforcing approach comparable to that of the invention. Indeed, whether or not the steel teachings as in the aforenoted patents are effective for purposes of providing shear steel reinforcing of prestressed concrete T beams is open to some question inasmuch as the practical commercial practices in this specialized industry have to a large extent centered either on the use of wire mesh both for the reinforcing in the slab portion of a T beam as well as for the shear steel reinforcement in the leg of the T beam, or on the use of generally Z-shaped bars of steel for the shear steel reinforcement. In either case, considerable time and expense is required for multiple tying of the shear steel reinforcement in place; and the proper tie-in placement of shear steel elements in the leg of T beams, as in fact commercially practiced, is a problem not solely resolved by employing skilled workmen. Wire mesh is difficult to straighten out from a roll, cut to a desired size and then position and tie properly in the leg of a T beam even when the most competent of workmen handle the task.

Prestressed T beams of the type contemplated by the invention (whether of the single T or multiple T shape) are normally supported only at each end for floors and roofs of buildings; and this means that the forces of a live load applied intermediate the supported ends must be transmitted through the T beam and downwardly at the supported ends without shear failure of the T beam. The necessary resistance to shear failure should be accomplished without excessively great amounts of shear steel, so as to avoid unduly high manufacturing expenses in terms of raw material costs, and without requiring tedious installation of the shear steel reinforcing elements, so as to avoid unduly high manufacturing expenses in terms of time and labor costs. The shear steel teaching of this invention approaches this problem from the conceptual viewpoint of standardization and automation, with all of the attendant advantages flowing therefrom. Thus, excessively large quantities of shear steel are avoided. At the same time, requisite shear strength in T beams is achieved. The number of ties which must be made when using the composite shear steel members of the present invention is vastly reduced as compared to those required in the prior art.

Improved placement of active shear reinforcement elements is gained by practice of this invention. Prefabricated composite assemblies of shear steel in large but relatively easily handled section (at least 9 feet and no more than 12 feet in length) are supplied in flat condition, with several bundled together. As few as five or six ties will satisfactorily secure a composite shear steel member of the invention in place within the leg of a T, both to the prestressing cables and to steel reinforcement in the slab of the T.

The improved placement of the active shear steel reinforcing elements as taught herein causes the concrete of the T beams to carry and dissipate or distribute the shear forces more effectively than beams formed using shear steel reinforcement which relies upon the strength of steel bars embedded longitudinally therewithin.

Experience has demonstrated that forces of shear are concentrated in moments extending from an approximately horizontal direction within the leg of a T up to an angle approaching approximately 45° from the horizontal along the longitudinal base of the T. Anchorage of longitudinal steel rods in the leg of a T, therefore, has been found to play little if any significant part in shear reinforcement, even though it sometimes has been a matter of considerable preoccupation in the approach to shear reinforcement in the past.

The new composite shear steel teaching of this invention does not depend upon achieving significant anchorage between concrete and longitudinal rods. In fact, an essential characteristic of the composite shear steel of the invention is that the transverse rods of the prefabricated sections or members do the work of resisting shear, and the longitudinal rods serve fundamentally as accurate spacing means, not load carrying elements nor even as means for primarily achieving anchorage in the concrete. Thus, in the practice of this invention, the quantum of shear steel transverse elements in the T beam effectively acts in cooperation with the concrete in the leg of the T beam to dissipate shear forces, without any true dependance upon horizontal or longitudinal steel for this function.

The invention will be described by reference to a drawing made a part hereof wherein.

Figure 2:
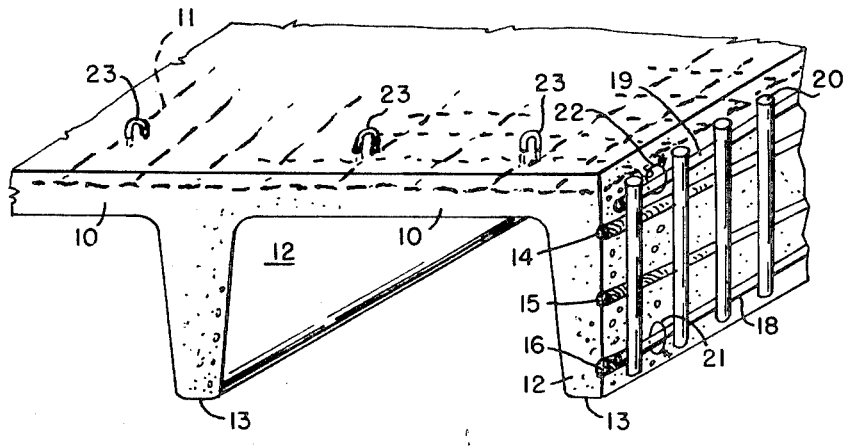
FIG. 2 is a schematic fragmentary view of a double T beam of the invention, with a vertical cross-sectional view through one of the T's in the length direction.
Figure 1:
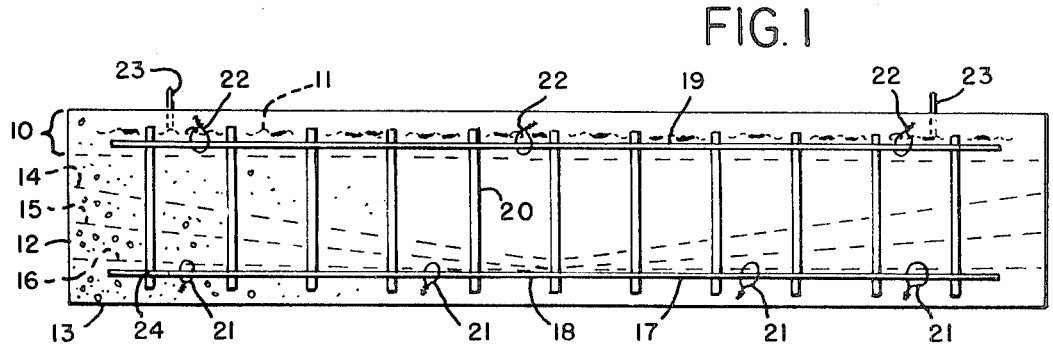
FIG. 1 is a schematic vertical cross-section along the length of a single T beam of the invention, with the composite shear steel reinforcing member shown by solid lines and other elements illustrated phantomly by discontinuous lines.

The essential elements of a T beam structure according to this invention, whether in a single or double T beam configuration, are schematically illustrated in the drawing, particularly FIGS. 1 and 2.

The concrete slab 10, or cross member of the T, is about 2 inches thick, but may optionally be as much as 4 inches thick. The slab 10 is provided with a steel wire mesh reinforcement 11 extending in the plane of the slab 10 and embedded in the concrete at a depth or level such that the wire mesh is spaced at least about one inch (i.e., generally centrally located) from both outer exposed surfaces of the concrete forming the slab. The wire mesh characteristically employed is formed of wire having a diameter no larger than about 0.162 inch (e.g., 8 gauge wire up to about 12 gauge wire) spaced at about five to possibly eight inches (usually about six inches) on center in a perpendicularly intersecting grid pattern. The grid intersections are normally welded to fix the wire in the square or rectangular grid pattern; and the wire mesh product is supplied in large rolls from which the required area of wire mesh is cut and then positioned in the slab, as illustrated.

The leg 12 of the T beam depends downwardly from the slab position 10; and it is in this leg portion 12 that the shear forces must be dissipated or distributed in sound T beam structures. The depth of a leg—and in fact the depth of the T beam itself—is considered to extend from the top surface of the slab 10 to the bottom-most edge 13 of a leg 12. In general, this depth may vary from about 12 inches up to about 48 inches (usually about 20 to 40 inches).

The stress members, such as strands or cables 14, 15 and 16, in a leg 12 (e.g., in each leg 12 of a double T beam) are usually arranged so that the effective prestressing components of force are essentially centered in a vertical plane bisecting the leg 12 along its longitudinal direction or length. However, laterally spaced cables may be employed in a leg; and in such cases, the prestressing cable arrangement is balanced so that laterally spaced prestressing forces are essentially balanced. The bottom-most cable 16 in a leg 12 is normally the cable nearest to parallel condition with the bottom 13 of a leg 12—with other cables, such as cables 14 and 15, tie in any suitable manner toward the bottom-most cable 16 near the center of the beam length. The effective result, upon stressing cables 14, 15 and 16, and curing the concrete (usually by passing steam in the mold for the T beam as is well known) is to build in a latent "camber" in the final prestressed precast T beam structure, and thereby enhance its load carrying capacity along its length between structural supports at its end.

A shear steel reinforcing composite structural member 17, as illustrated by solid lines in FIG. 1, is also placed in the leg of the T beam. Only one such composite structural member is illustrated in the T beam structure of FIG. 1, although several such members may be employed in T beams, particularly when the T beams are exceedingly long. The length of the shear steel reinforcing member 17 is not in excess of about 12 feet; therefore at least two such reinforcing members is needed where T beams of about 24 feet in length are formed.

Figure 5:
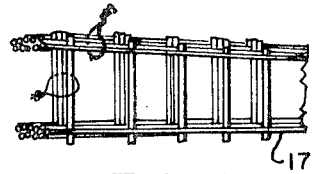
FIG. 5 is a schematic illustration of a bundle of composite shear steel reinforcing members.

Each shear steel composite member is prefabricated; and is in essentially flat condition. Bundles of several shear steel structural members, as illustrated in FIG. 5, contain no more than about 20 or 25, or possibly 30, of the composite structural sections or members. Damage in shipment and handling prior to emplacement in a T beam is to be avoided; but a practical quantity to reduce handling costs is needed. The number of composite sections in a bundle is such that the total weight for the bundle does not exceed about a hundred pounds. Thus, in the case of the larger and wider composite shear reinforcing members, as few as ten may be bundled together and tie by a twist of wire, as illustrated. Each section or member 17 is at least about 9 feet in length, but is no more than about 12 feet in length. Beyond 12 feet in length, unwanted bending of the longitudinal rods 18 and 19 occurs too readily in such steps as the placement in the mold for a leg of a T beam.

Each composite shear steel section or member, as illustrated in FIG. 1, consists of two longitudinal steel rods or wires 18 and 19, plus a plurality of transverse steel rods 20 of larger diameter or cross-section than the longitudinal rods.

The longitudinal rods 18 and 19 are of essentially equal length (from 9 to 12 feet, preferably about 10 feet) and are spaced from each other a predetermined distance in essentially parallel alignment. The predetermined spacing is dependent upon the length of the transverse rods 20, and is such that the longitudinal rods 18 and 19 are spaced from each other a distance less than the length of the transverse rods 20 but no less than about one inch shorter than the length of the transverse rods 20. Preferably the longitudinal rods 18 and 19 are spaced a distance approximately one-half inch shorter than the length of the transverse rods 20, as will be explained. In terms of diameter, the size of the longitudinal rods 18 and 19 ranges from about 0.135 inch (10 gauge wire) up to about 0.162 (8 gauge wire), with about 0.148 inch (9 gauge wire) being preferred. These longitudinal rods are suitably smooth or non-knurled, since a binding mechanical or other type of anchorage between them and the concrete is not per se critical. They must, however, serve as holders for the aligned transverse rods 20 and also as the elements for tying the composite shear steel section or member in place preliminary to the pouring of concrete in the formation of the prestressed T beams. Where non-circular longitudinal rods 18 and 19 are used (and also where generally circular rods of either smooth or knurled character are used) the cross-sectional size generally should be no smaller than 0.014 square inch at a minimum and no larger than about 0.022 square inch at a maximum, with a cross section as high as 0.024 being optional but unnecessary. In all cases the cross-sectional size of the longitudinal rods 18 and 19 is not less than half that for the transverse rods 20, which, among other things, is a necessary relationship for the maintenance of strong weld joints at the intersections between such rods.

The transverse rods 20 are all of essentially equal length, and are not less than 9 inches nor more than 46 inches in length. The length for the transverse rods is dependent on the depth of the particular T beam in which a shear steel section is to be used. This transverse length may vary from about 2 or 2.25 inches up to 3 or possibly 3.25 inches less than the total depth of a T beam. Preferred transverse lengths are about 2.75 less than the depth of the T beam which allows sufficient concrete (e.g., at least one inch) over the opposite ends of the transverse rod to satisfy Underwriters requirements and yet provides a continuous vertical stretch of shear steel of sufficient and significant length to perform the shear force take-up function essentially throughout the depth of the T beam.

Figure 4:
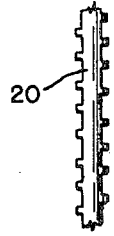
FIG. 4 is a schematic section of a knurled rod.

Of critical importance are the spacing and the size of the transverse rods 20. Spacing in essentially parallel alignment is from 7 to 12 inches "on center," with 7.5 to 10 inches "on center" spacing being preferred. Each composite member 17 contains between 10 and 20 transverse steel rods. In terms of diameter, the transverse rods are at least 0.177 inch (7 gauge) up to about 0.192 inch (6 gauge). Transverse rods of 0.188 inch diameter (0.0258 square inch in cross-section) have been found to be especially useful. Transverse rods should be at least about 0.023 square inch in cross-section, at a minimum, up to about 0.03 or possibly 0.035 square inch in cross section. Such figures may be useful where the desire is to employ non-circular (e.g., square cross-section) transverse rods, or rods having a variable cross-section, such as some knurled rods (see FIG. 4). However, smooth circular rods have been found entirely effective. Thus knurled rods, commonly but mistakenly believed to give better concrete adhesion or mechanical interlocking, are unnecessary. Tests have established that the bond between smooth rods and the precast concrete formulas of current popular usage (e.g., 5,000 pound concrete and even 7,500 pound concrete and higher) is, in terms of the load required for pull-out of the smooth rods, not significantly different from that between knurled rods and such concrete. The fractional increase in mechanical bond strength gained by the use of knurled rods is not believed to compensate for the loss of steel strength at equivalent steel quantities. For example, a smooth 3/16 inch (0.188 inch) steel rod in type M mortar tested at an average value of 1,740 pounds maximum load for pull-out; whereas a knurled rod of the same size tested at an average maximum value of 1,852 pounds. But the smooth rod exhibited an average breaking or yield strength of 2,213 pounds, whereas the knurled rod average breaking or yield strength was 2,137. Of further significance is the fact that the forces of shear in a pre-stressed precast T beam tend to exert themselves primarily in a lateral direction upon the transverse steel rods, as distinguished from a vertical or a pull-out direction (although some components of the shear force admittedly also extend in the pull-out direction as the transverse rods are positioned in a T beam).

The significant spacing of the transverse rods 20 as taught herein assists in maintaining concrete integrity and at the same time is such as to give shear reinforcement at interrupted intervals where needed in light of the distribution of shear components of force. But in light of this spacing, and the arrangement of the composite members 17 in a T beam, the yield strength of the transverse steel rods should equal or exceed 50,000 p.s.i. Generally, yield strengths of at least 60,000 p.s.i. are preferred, with ultimate strength (at break) as high as 80,000 or 90,000 p.s.i. or higher. This is true even though yield strengths in excess of 60,000 p.s.i. are generally not considered in calculating shear reinforcement (see page 121 of A.C.I. 318–63—American Concrete Institute Standard 318–63, here incorporated by reference).

Figure 3:
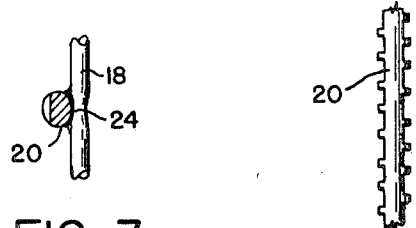
FIG. 3 is a schematic illustration of a weld at an intersection of longitudinal and transverse rods in the composite shear steel reinforcing member.

Each intersection 24 of a transverse rod 20 with a longitudinal rod 18 and 19 is united by a spot weld (see FIG. 3), suitably accomplished by electrode welding without the addition of fluxes. This fixes the transverse rods 20 in spaced position along the length of the longitudinal mounting rods 18 and 19; and the spacing of the transverse rods is maintained essentially uniform along the length of the longitudinal rods. The size relationship between the transverse and longitudinal rods contributes significantly to the achievement of welds having strengths at least equal to the yield strength of the transverse rods; and these welded intersections also contribute to a mechanical anchoring of the transverse rods in the concrete, further increasing their already high resistance to pull-out forces.

To be observed is the fact that, in each composite shear steel reinforcing member 17, the longitudinal rods 18 and 19 preferably project outwardly from the terminal transverse rods 20 a distance approximately equal to one-half the "on center" spacing of the transverse rods 20. Stated another way, the terminal transverse rods 20 are spaced from the ends of the longitudinal rods a distance equal to about one-half the spacing between adjacent transverse rods in the composite member 17. Actually, the outward projection of the longitudinal rods need not be more than about 2 inches, regardless of the spacing between transverse rods; but at least a 2 inch projection, and not more than a 7 inch projection, of the longitudinal rods beyond the terminal transverse rods is needed. The projection serves to provide a guide for positioning adjacent composite reinforcing members 17 in linear alignment within a T beam and also serves to provide optional means for tying adjacent linearly aligned composite members together to maintain them in alignment, where such tying is desired.

Also, each transverse rod 20 projects and terminates a distance beyond the intersection of it with the longitudinal rods 18 and 19. The projection of transverse rods 20, however, is never more than one-half inch above longitudinal rod 19 nor more than one-half inch below longitudinal rod 18. Preferably the projection of the transverse rods is not in excess of about one-fourth inch beyond the intersection with the longitudinal rods. This projection serves a shear reinforcing function above and below the longitudinal rods, which is a necessary function in terms of guarding against significance for any incidental shear fracture along the line of the longitudinal rods. It also serves as a practical safeguard in the welding fabrication of the composite shear reinforcing member. Welds of exceedingly strong character are most readily achieved by maintaining a small projection of the transverse rods beyond the longitudinal rods. Still further, the small projection of the transverse rods beyond the longitudinal rods contributes to an interlocking with the wire mesh 11 in the slab 10 as well as to an interlocking with a lower prestress cable 16 to which the composite shear reinforcing member 17 is tied. Thus, the small projection of the transverse rods guards against slippage of the composite shear reinforcing member 17 from one side to the other of cable 16 after the composite member 17 has been tied at three or four places along the length of the longitudinal rod 18 to cable 16. Similarly, the projection guards against slippage of the upper part of the composite member 17 after it is tied along longitudinal rod 19 to wire mesh 11. A suitable tie as here contemplated is formed by twisting or clamping a strand of wire about the elements, as illustrated at numerals 21 and 22 in FIGS. 1 and 2.

Cable loops 23 project above the surface of slab 10 and are anchored in slab 10 to the wire mesh 11. These serve as temporary elements by which a T beam may be lifted for shipment and implacement in desired structural relationship with support members and other T beams and the like. They are then cut off.

In manufacture, the prestress cables composite reinforcing 17, wire mesh 11 and any other incidental steel elements are arranged as illustrated in a T beam mold, and then the concrete is poured, the cable stressed, and the concrete cured. The speed and reliability by which this is accomplished in practicing this invention serves to reduce manufacturing costs without sacrifice of quality, and in fact gives an improvement in the uniformity and reliability in terms of quality for the end product which has long been needed.

A specific illustrative composite shear steel reinforcing member according to the invention was formed as follows: Sixteen transverse rods of 0.188 diameter and a yield strength of 60,000 p.s.i. were spaced on center at 7.5 inch intervals along the length of two ten foot longitudinal steel rods of 0.148 in diameter and resistance welded at intersections. The composite member was made for a twenty inch T beam (i.e., a T beam 20 inches in depth); therefore, the length of the transverse rods employed was 17.25 inches. The longitudinal rods were spaced 1/4 inch back from the terminal ends of the transverse rods; and the terminal ends of each of the longitudinal rods were maintained free of a transverse rod for about 3.75 inches. Twenty-five of these composite structures were made and bundled as illustrated in FIG. 5. Each member weighed about 3.3 pounds; and the total bundle was somewhat under 85 pounds in weight.

In T beams of 20 inch depth, these composite shear steel reinforcing members are positioned and tied as illustrated in the drawing, particularly FIGS. 1 and 2. This is accomplished quickly as there is no special measuring required and the longitudinal rods of each composite member are easily tied to cable 16 and wire mesh 11 at suitably seven points (e.g., no more than four along each longitudinal rod of the composite member 17). The concrete of a formula calculated to support 5,000 pounds is poured and cured in the usual manner. Resulting T beams satisfied shear steel reinforcement criteria of A.C.I. 318–63, section 26.10—shear, with the ultimate shear carried by the shear reinforcement being in excess of 12.4 kips per foot. Of particular significance is the fact that components of shear force, tending as they do in practice to primarily extend in a horizontal direction up to an angle of about 30° or 40° from the horizontal, are carried by the transverse rods and the concrete as a combination, which in this new structural arrangement reduces to the negligible any shear cracking. No problems arose in connection with shifting or achieving proper placement of the shear reinforcement; and the speed and reliability with which the shear reinforcement was thus accomplished is unparalleled in the industry.

That which is claimed is:

1. As a new article of manufacture: a composite shear steel reinforcing member for prestressed precast concrete T beams, said member consisting of a combination of:
   (a) two longitudinal steel rods of essentially equal length spaced from each other a predetermined distance in essentially parallel alignment, each said longitudinal rod being between 9 and 12 feet in length and having a cross-sectional area of at least about 0.014 square inch up to about 0.024 square inch,
   (b) a plurality of shear-resisting transverse steel rods, between 10 and 20 in number, all of essentially equal length and not less than 9 inches nor more than 46 inches in length, the cross-sectional area of each said transverse rod being at least about 0.023 square inch up to about 0.03 square inch and being greater than the cross-sectional area of either said longitudinal rod but not more than about twice the cross-sectional area of either said longitudinal rod, said transverse steel rods being characterized by having a yield strength of at least 50,000 p.s.i., said transverse rods being essentially uniformly spaced at predetermined increments between about 7 and 12 inches on center in essentially parallel alignment with each other along the length of said longitudinal rods with each said transverse rod perpendicularly intersecting each of said longitudinal rods, at least the terminal two inches of each end of said longitudinal rods being free of any intersection by a transverse rod, the terminal ends of each of said transverse rods being arranged to extend beyond the intersection of said transverse rods with said longitudinal rods in an amount not greater than ½ inch beyond said intersection, and said intersections being spot welded to permanently unite said transverse steel rods to said longitudinal rods.

2. As a new article of manufacture: a bundle of between 10 and 30 composite shear steel reinforcing members, each of said members satisfying the requirements of claim 1 and additionally characterized by the feature that the terminal ends of the transverse rods thereof extend beyond the longitudinal rods thereof an amount not greater than one-fourth inch, and by the feature that said transverse rods are spaced from each other no farther than 10 inches on center along the length of said longitudinal rods.

3. The article of claim 2 wherein the longitudinal rods of the composite shear steel reinforcing members are no more than about 10 feet in length and the transverse rods thereof are circular in cross-section, about 0.188 inch in diameter, and spaced on center at approximately 7.5 inches.

4. The article of claim 1 wherein both the longitudinal rods and the transverse rods are circular in cross-section and non-knurled.

5. The article of claim 1 wherein the transverse rods are knurled.

6. The article of claim 5 wherein the spacing of said transverse rods is no greater than 10 inches on center.

7. The article of claim 1 wherein the longitudinal rods are not knurled and the transverse rods are knurled.

8. The article of claim 1 wherein the spacing of the terminal transverse rods of said reinforcing member from the ends of said longitudinal rods is at a distance up to about one-half the spacing distance between adjacent transverse rods of said member.

9. The article of claim 1 wherein the spacing of said transverse rods is no greater than 10 inches on center and wherein the terminal ends of said transverse rods extend beyond the intersection of said transverse rods with said longitudinal rods no more than one-fourth inch.

10. A prestressed precast concrete T beam comprising a longitudinally-extending concrete slab cross member and at least one aligned longitudinally-extending depending concrete leg part, having a depth between 12 and 48 inches from the top surface of said slab cross member to the bottom edge of said leg part, with the concrete of said leg part and cross member integrally continuous, said T beam having steel reinforcing embedded in the concrete of said cross member and stressing cables embedded and longitudinally aligned within the concrete of said leg part, and being further characterized by having a composite shear steel reinforcing member embedded within the concrete of said leg part,
   (A) said composite reinforcing member consisting of a combination of two longitudinal steel rods of essentially equal length spaced from each other a predetermined distance in essentially parallel alignment, each said longitudinal rod having a cross-sectional area of at least about 0.014 square inch up to about 0.024 square inch, and a plurality of shear-resisting transverse steel rods of essentially equal length uniformly spaced from each other at predetermined increments between about 7 and 12 inches on center in essentially parallel alignment along the length of said longitudinal rods, with each said transverse rod perpendicularly intersecting each said longitudinal rod, each said transverse rod being characterized by having a yield at strength of at least 50,000 p.s.i. and a cross-sectional area of at least about 0.023 square inch and greater than the cross-sectional area of either of said longitudinal rods but not more than about twice the cross-sectional area of either of said longitudinal rods and not over about 0.03 square inch, at least the terminal two inches of each said longitudinal rod being free of any intersection with a transverse rod, the terminal ends of each said transverse rod being arranged to extend beyond each intersection with said longitudinal rods in an amount not greater than ½ inch, and said intersections being spot welded to permanently unite said transverse steel rods to said longitudinal rods,
   (B) said longitudinal steel rods of said composite reinforcing member being longitudinally aligned within said leg part and said transverse rods of said composite reinforcing member being perpendicular to said cross member,
   (C) said longitudinal rod of said composite reinforcing member farthest from said cross member being tied at spaced intervals to one of said stressing cables in said leg part, (D) said longitudinal rod of said composite reinforcing member nearest said cross member being tied at spaced intervals to the steel reinforcing in said cross member, and (E) said transverse rods of said composite reinforcing member being of a length between 9 and 46 inches and being between two and 3.25 inches less than said depth from the top surface of said cross member to the bottom edge of said leg part.

References Cited

UNITED STATES PATENTS

| | | | |
|---|---|---|---|
| 799,510 | 9/1905 | Williams | 52—664 |
| 820,839 | 5/1906 | Woodruff | 52—690 |
| 1,102,580 | 7/1914 | Grady | 52—690 |
| 2,990,949 | 7/1961 | Roman | 206—46 (HDW) |
| 3,323,263 | 6/1967 | Adams | 52—223 |
| 3,465,484 | 9/1969 | Zaldastani | 52—223 |
| 1,551,863 | 9/1925 | Berry | 52—105 |
| 1,674,086 | 6/1928 | Barton | 52—646 |
| 3,348,354 | 10/1967 | Bartlett | 52—740 |
| 3,475,876 | 11/1969 | Oroschakoff | 52—669 |

FOREIGN PATENTS

| | | | |
|---|---|---|---|
| 817,758 | 1937 | France | 52—690 |
| 1,231,162 | 1960 | France | 52—226 |
| 116,702 | 1918 | Great Britain | 52—662 |
| 561,135 | 5/1944 | Great Britain | 52—223 |

FRANK L. ABBOTT, Primary Examiner

U.S. Cl. X.R.

52—602, 690, 669